United States Patent [19]

Heise et al.

[11] Patent Number: 5,170,613
[45] Date of Patent: Dec. 15, 1992

[54] REEL MOTOR CUTTING UNIT FRAME

[75] Inventors: Robert P. Heise; Stephen E. O'Brien, both of Ottumwa, Iowa

[73] Assignee: Deere & Company, Moline, Ill.

[21] Appl. No.: 775,874

[22] Filed: Oct. 15, 1991

[51] Int. Cl.⁵ .................... A01D 34/47; A01D 34/62; A01D 67/00
[52] U.S. Cl. ................................ 56/249; 56/DIG. 20
[58] Field of Search .............. 56/249, 294, 249.5, 56/DIG. 17, DIG. 20, 7

[56] References Cited

U.S. PATENT DOCUMENTS

| | | | |
|---|---|---|---|
| 2,646,658 | 7/1953 | Dunham | 56/249 |
| 3,187,492 | 6/1965 | Bergen | 56/249 |
| 3,685,265 | 8/1972 | Horowitz et al. | 56/249 |
| 3,759,022 | 9/1973 | Snyder et al. | 56/294 X |
| 4,769,976 | 9/1988 | Bassett et al. | 56/249 X |

Primary Examiner—Stephen J. Novosad

[57] ABSTRACT

A real mower includes a cutting unit having a frame including opposite side plates joined together by front and rear cross members, the rear cross member being located above upright ends of a u-shaped bed knife support which are respectively bolted to the side plates by upper and lower mounting bolts. A pair of stress relief slots is respectively provided in the pair of side plate between the bed knife support and the rear cross member, the slots respectively being arranged arcuately about the upper bed knife support mounting bolts.

7 Claims, 2 Drawing Sheets

REEL MOTOR CUTTING UNIT FRAME

BACKGROUND OF THE INVENTION

The present invention relates to frames for the cutting units of reel mowers and more particularly relates to the mounting of bed knives to such frames.

The reel and bed knife of a cutting unit of a reel mower of the type used for mowing golf greens (commonly called greensmowers) are typically mounted in a frame defined by opposite vertical side plates joined together by horizontal cross frame members extending between and having their opposite ends welded or otherwise fixed to the side plates. A common way of mounting the bed knife is to provide a bed knife support having its opposite upright ends bolted to the side plates, with the bed knife being fixed against a substantially flat bottom surface of the bed knife support by a plurality of threaded fasteners such as screws.

A problem encountered in the manufacture of cutting units of the above-described type is that the assembly of the side plates and cross frame members sometimes results in the side plates being other than parallel to each other and perpendicular to the cross frame members. Then, when the bed knife support is fastened in place, that portion which includes the bottom surface is distorted resulting in the bed knife being distorted or bowed such that a proper clearance with the reel throughout the length of the bed knife is difficult to achieve.

It is an object of the invention to provide a cutting unit frame which is made in such a way as to avoid the aforementioned problem of bed knife distortion which occurs during the assembly of the bed knife and its support to the cutting unit frame.

SUMMARY OF THE INVENTION

According to the present invention there is provided an improved cutting unit frame wherein the bed knife support extends between and has opposite ends bolted to lower rear areas of opposite side plates by upper and lower clamping assemblies. The upper clamping assemblies are each disposed directly below an upper rear frame cross member having its opposite ends welded to the side plates. Slots are arranged arcuately about the bed knife support mounting bolts of the upper clamping assemblies in a location between the cross member and the mounting bolts so as to, in effect, decouple the mounting zones of the bed knife support ends from the remainder of the side plates. The slots serve to relieve stresses which might otherwise be transferred to the bed knife support during the fastening of the latter to the side plates in instances where the side plates are other than parallel to each other and perpendicular with the frame cross member.

DESCRIPTION OF THE PREFERRED EMBODIMENT

Figure 1:
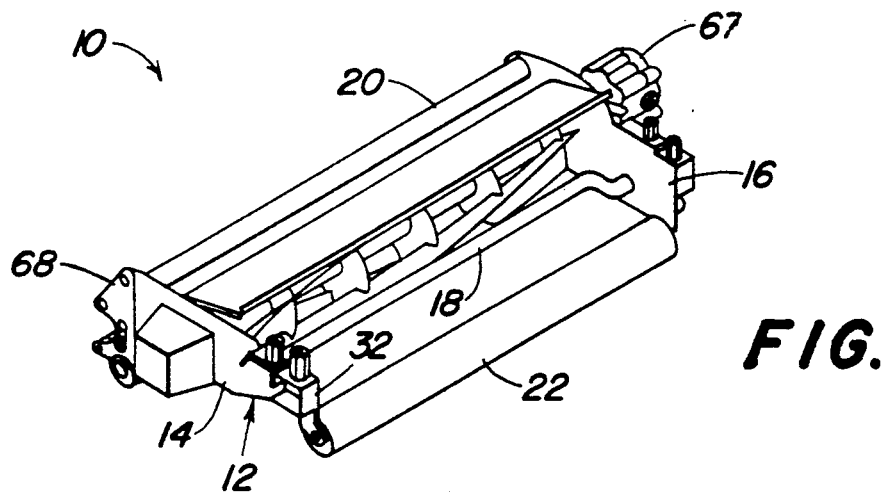
FIG. 1 is a right front perspective view of a cutting unit constructed in accordance with the principles of the present invention.
Figure 2:
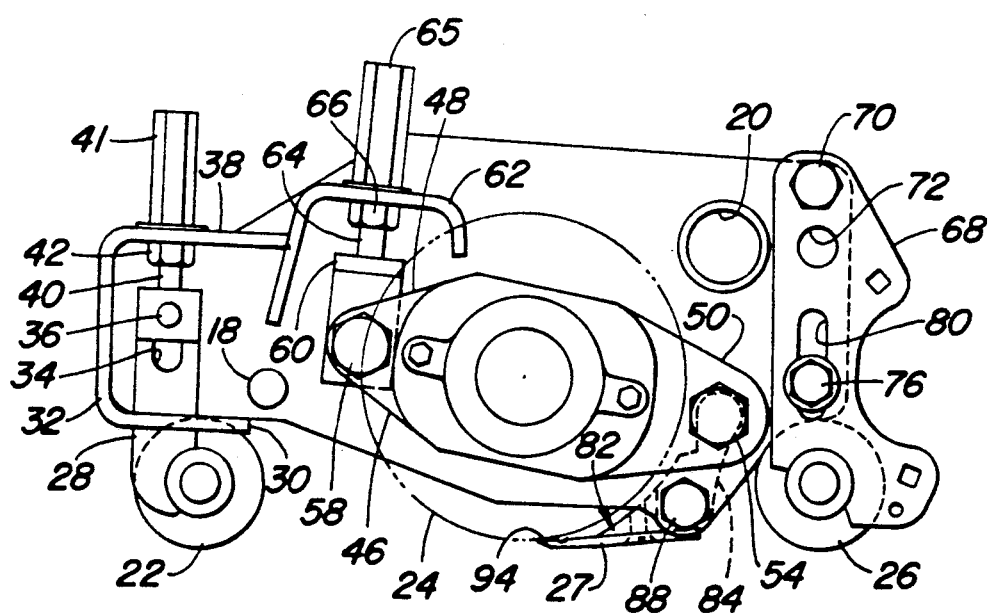
FIG 2 is a left side elevational view of the cutting unit shown in FIG. 1, but with the reel drive motor omitted.
Figure 3:
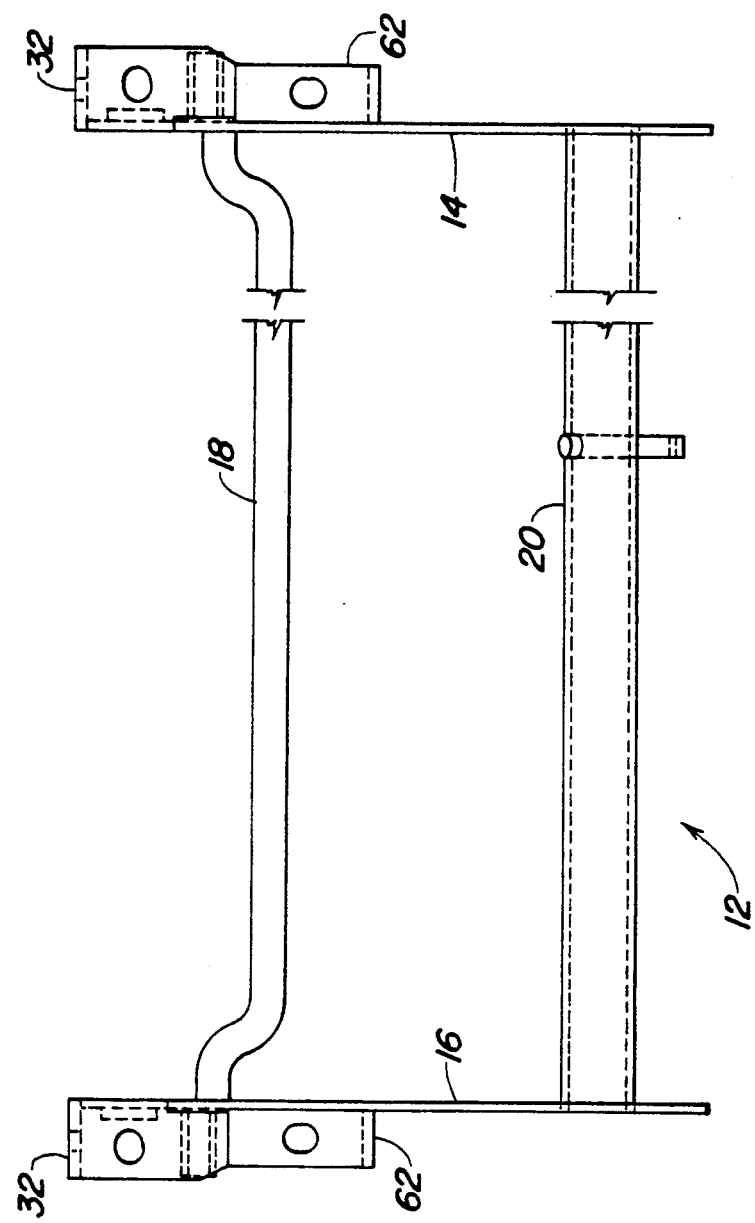
FIG. 3 is a top plan view of the frame of the cutting unit.
Figure 4:
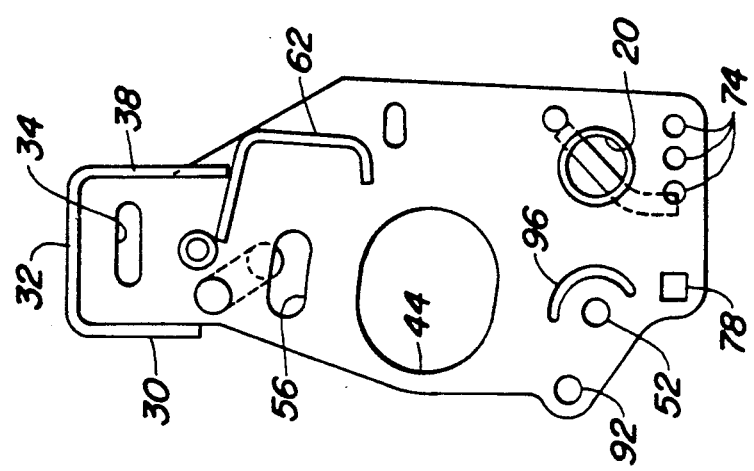
FIG. 4 is a left end view of the frame shown in FIG. 3.

Referring now to FIGS. 1 and 2, there is shown a cutting unit 10 of a reel mower such as a greensmower. The cutting unit 10 comprises a frame 12 (shown alone in FIGS. 3 and 4) including right and left side plates or sheets 14 and 16 joined together at a forward location by a front cross member 18 formed by a rod including a horizontal center section joined to offset ends respectively received in and welded to the side plates 14 and 16 and joined together at an upper rear location by a horizontal rear cross member 20 formed by a cylindrical tubular member having opposite ends respectively welded to the side plates 14 and 16. It is here noted that the cross members 18 and 20 could be provided with respective flanges with their securement to the side plates being by bolting rather than by welding.

Extending between and having opposite ends adjustably mounted to the side plates 14 and 16 are a front roller 22, a cutting reel 24 and a rear roller 26; and extending between and being fixedly mounted to the side plates 14 and 16 so as to cooperate with the reel 24 in cutting grass is a bed knife 27.

Specifically, the opposite ends of the front roller 22 are each rotatably mounted in a cylindrical receptacle defining the lower end of a front roller bracket 28. The brackets 28 each include an intermediate portion of rectangular section which is located at the outer surface of a respective one of the side plates 14 and 16 and is vertically slidably received in a complimentary shaped opening provided in a horizontal lower leg 30 of a rearwardly opening, u-shaped front roller bracket support 32 welded to the outer surface of each of the side plates. Defining the respective upper ends of the brackets 28 are adjusting blocks containing respective threaded openings aligned with vertical slots 34 respectively provided in the side plates, with a cap screw 36 being received through each vertical slot and threaded into the adjacent adjusting block. Each of the supports 32 has an upper leg 38 located above one of the adjusting blocks and a height of cut adjuster bolt 40 has its lower end welded to the adjuster block and is received through each leg 38. An elongate adjuster nut 41 is threaded onto the upper end of the bolt 40 and a jam nut 42 received on each bolt 40 below the leg 38 so as to hold the associated end of the roller 22 in an adjusted position. Thus, the front roller 22 may be adjusted vertically relative to the frame 12 by loosening the cap screws 36 and the jam nuts 42 and turning the nuts 41 in a direction to either raise or lower the roller as desired.

The reel 24 has a central shaft having its opposite ends projecting through respective oval shaped openings 44 (FlG. 2) provided at lower central arm as of the side plates 14 and 16. The reel shaft ends are rotatably mounted in respective bearings (not visible) located within respective bearing housings 46 located at the respective outer surfaces of the side plates 14 and 16. The bearing housings 46 include rearward and forward apertured ears 48 and 50. Extending through the rearward ears 48 and aligned holes 52 provided in the side plates 14 and 16 are respective bolts of rear clamping bolt and nut assemblies 54, and extending through the forward ears and aligned openings 56 that are formed arcuately about the holes 52 are respective bolts of front clamping bolt and nut assemblies 58, the bolts of the assemblies 58 also passing through holes provided in respective inverted L-shaped adjustment brackets 60 that are located between the bearing housings 46 and the outer surfaces of the side plates 14 and 16. An adjuster support bracket 62 is fixed to each of the side plates 14 and 16 so as to be above an outwardly extending leg of an adjacent one of the adjustment brackets 60. An adjuster bolt 64 has its lower end welded to the outwardly extending leg of each of the brackets 60 and extends through each adjuster support bracket 62. Threaded onto the upper end of each of the bolts 64 is and elongate adjuster nut 65 and received on each of the bolts at a location below the bracket 62 is a jam nut 66. Thus it will be appreciated that the vertical position of the reel 24 relative to the frame 12 can be adjusted by loosening the nuts of the rear and front clamping bolt assemblies 54 and 58 together with the jam nuts 66 and then by turning the adjuster nuts 65 so as to pivot the bearing housings upwardly or downwardly about the bolts of the rear clamping bolt and nut assemblies 54 so as to adjust the reel up or down as desired for a purpose to be described. Mounted to the left bearing housing 46 is a hydraulic reel drive motor 67 having its output coupled to the reel shaft.

The opposite ends of the rear roller 26 are respectively rotatably mounted in cylindrical receptacles forming the lower ends of upright rear roller brackets 68. Respective bolts of upper clamping bolt and nut assemblies 70 are received through a selected one of a set of two vertically spaced holes 72 provided in each bracket 68 and one of a set of three vertically spaced holes 74 provided in the upper rear end portion of each of the side plates 14 and 16. Lower, square neck clamping bolts of lower nut and bolt assemblies 76 are respectively received in square openings 78 provided in the side plates 14 and 16 below and in vertical alignment with the sets of holes 74, the bolts of the assemblies 76 also extending through respective vertically elongated openings 80 provided in each bracket 68 below and in vertical alignment with the set of holes 72. Thus, it will be appreciated that the brackets 68 may be adjusted vertically relative to the frame 12 by removing the upper clamping bolts of the nut and bolt assemblies 70 and loosening the nuts of the lower nut and clamping bolt assemblies 76 so as to permit the brackets 68 to be adjusted up or down until a desired different alignment of the bracket holes 72 and side plate holes 74 is achieved, the bolts of the assemblies 70 then being reinserted and the nuts tightened together with tightening of the nuts of the lower clamping nut and bolt assemblies 76.

The bed knife 27 is secured to a substantially planar bottom surface of an intermediate portion of a bed knife support 82 by a plurality of screws (not shown) which pass through holes provided in the bed knife and are screwed into threaded blind bores provided in the bed knife support 82. The support 82 includes opposite upright ends 84 joined to opposite ends of the intermediate portion and secured to the outer surfaces of the side plates 14 and 16 by the clamping bolt assemblies 54, which serve also as upper bed knife support clamping bolt assemblies, and by lower bed knife support clamping assemblies including cap screws 88 which extend through respective lower mounting holes 92 provided in the side plates 14 and 16 at locations below and slightly forwardly of the upper mounting holes 52. The cap screws 88 are respectively threaded into tapped and threaded holes provided in inwardly extending, thickened portions of the bed knife support ends 84. When the bed knife support 82 is fastened into place, a cutting edge 94 of the bed knife 27 is disposed in close proximity to a location just behind and above the lower most point of the path swept by the reel 24 so as to cooperate with the reel in cutting grass.

The cutting unit structure thus far described is more or less conventional and has the problem that the welding, or bolting if that be the case, of the cross members 18 and 20 to the side plates 14 and 16 may cause distortions which result in the plates 14 and 16 being other than parallel to each other and perpendicular to the front and rear cross members 18 and 20, respectively. When the side plates 14 and 16 are not so maintained, it has been found that fastening the bed knife support 82 in place, by tightening the nut and bolt assemblies 54 and cap screws 88, causes stresses to be transferred to the support 82 which result in the latter being distorted which in turn distorts the bed knife 27 resulting in the cutting edge 94 being disposed other than parallel to the path swept by the reel as is necessary for proper cutting action. Even adjustment of the reel 24 relative to the bed knife 27 fails to achieve the desired constant clearance between the reel blades and the bed knife.

The present invention remedies this problem and consists of a pair of stress relief slots 96 respectively formed in the side plates 14 and 16 in arcuate or curved disposition about the upper holes 52 in the side plates 14 and 16 at a location generally between the rear cross member 20 and the holes 52, it being noted that the holes 52 are in an area or zone directly beneath the cross member 20. The slots 96 act to structurally decouple the zone of attachment of the bed knife support 82 to the side plates 14 and 16 from the zone of attachment of the cross member 20 to the side plates. Thus, in the event that the assembly of the frame 12 has resulted in the latter being distorted such that the side plates 14 and 16 are other than parallel with each other and perpendicular to the cross members 18 and 20, stresses induced by the fastening of the bed knife support 82 to the side plates will be relieved through the arcuate stress relief slots 96 such that the bed knife support will not be distorted by such stresses. While the slots 96 are described as being continuous, the objects of the invention can be achieved by using multiple openings on each side arranged for accomplishing the decoupling effect.

We claim:

1. In a greensmower cutting unit including a frame comprising a pair of side plates interconnected by at least one cross member having its opposite ends fixed to the side plates, a bed knife support having its opposite ends fixed to the side plates at respective zones located in the vicinity of said at least one cross member, the improvement comprising: stress relief opening means formed in said pair of side plates at respective locations between said zones and said at least one cross member for substantially preventing stresses from being transferred to the bed knife support during the fixing of the latter to said side plate members.

2. The greensmower cutting unit frame defined in claim 1 wherein said at least one cross member has its opposite ends welded to said pair of side plates.

3. The greensmower cutting unit frame defined in claim 1 wherein said bed knife support has its opposite ends releasably fastened to said cutting unit frame.

4. The greensmower cutting unit frame defined in claim 3 wherein said at least one cross member has its opposite ends welded to said pair of side plates.

5. In a greensmower cutting unit frame including a pair of side plates interconnected by at least one cross member having its opposite ends fixed to said pair of side plates and upper and lower bed knife support mounting holes being provided in each side plate at respective zones located below the opposite ends of said at least one cross member, the improvement comprising: a stress relief opening means being provided in each side plate at a location between the upper bed knife support mounting hole and said at least one cross member.

6. The greensmower cutting unit frame as defined in claim 5 wherein the stress relief opening means is a continuous slot.

7. The greensmower cutting unit frame as defined in claim 6 wherein the continuous slot is arranged arcuately about said upper bed knife support mounting hole.

* * * * *